United States Patent

Bush et al.

[15] 3,649,761

[45] Mar. 14, 1972

[54] DIAL SELECTIVE WIDEBAND INTERCOMMUNICATION SYSTEM

[72] Inventors: Stanley E. Bush, Boulder, Colo.; David T. Olson, Hackensack, N.J.; George E. Saltus, Boulder, Colo.

[73] Assignee: Bell Telephone Laboratories, Incorporated, Murray Hill, N.J.

[22] Filed: Jan. 23, 1970

[21] Appl. No.: 5,243

[52] U.S. Cl. .......................179/2 TV, 179/18 AD, 179/1 CN

[51] Int. Cl. .......................H04m 11/00

[58] Field of Search...................179/99, 18 AD, 2 TV, 1 CN, 179/18 C

[56] References Cited

UNITED STATES PATENTS

| | | | |
|---|---|---|---|
| 3,335,226 | 8/1967 | Michael | 179/18 C |
| 3,519,744 | 7/1970 | Dorros | 179/2 TV |
| 3,450,845 | 6/1969 | Morse | 179/84 SS |
| 3,453,383 | 7/1969 | Schafer | 179/2 TV |
| 3,331,924 | 7/1967 | Reaves | 179/1 CN |
| 3,322,901 | 5/1967 | Trimmer | 179/1 CN |

OTHER PUBLICATIONS

Bell Laboratories " Record" May/June 1969 pp. 149- 153

*Primary Examiner*—Kathleen H. Claffy
*Assistant Examiner*—Thomas D. D'Amico
*Attorney*—R. J. Guenther and James Warren Falk

[57] ABSTRACT

A key telephone system is arranged with a selective intercommunication link to provide wideband service between any two stations served by the system. A station lockout circuit controls access to the link to insure that only two stations, calling station and a called station, may be connected to the link at one time. A selector circuit operates in conjunction with the lockout circuit to match the transmit-receive lead pairs of a called station with the proper lead pairs of the calling station. The system is arranged such that a three-party wideband conference may be established between a line, a first station and a second station connected to the first station via the link. All the parties to the conference are connected together for continuous audio transmission while wideband transmission is maintained only between two of the parties under selective control of the first station.

19 Claims, 14 Drawing Figures

INVENTORS S.E. BUSH
D.T. OLSON
G.E. SALTUS
BY David Hanenbaum
ATTORNEY

DIAL SELECTIVE WIDEBAND INTERCOMMUNICATION SYSTEM

BACKGROUND OF THE INVENTION

This invention relates generally to key telephone systems and more particularly to an arrangement for providing wideband intercom service between the key stations.

DESCRIPTION OF THE PRIOR ART

Extensive development of key telephone systems in recent years has made possible the provision of numerous special features which render such key telephone systems more convenient and flexible. For example, circuit arrangements have been provided which enable communication paths to be established from any station to any one of a number of lines by operating a key associated with the desired line. In such systems, it is customary to arrange one of the lines as an intercom link thereby allowing a subscriber at any key station to communicate with a subscriber at any other key station merely upon the operation of the intercom key at each of the stations.

In such arrangements, the intercom link is usually arranged such that the enabling of the intercom key at any station enables separate transmission paths to be established from the transmitter and receiver of the associated station to respective transmit and receive buses of the common link. An amplifier, commonly called a talk-back amplifier, is connected between the buses such that transmission from any station to any other station is possible via the single link intercom. Under such an arrangement, transmission originating from any station will be received at all the connected stations including the originating station. When more than two stations access the link during the same time interval, transmission is established between all the stations on the link on a conference basis.

Recent developments in wideband service, an example of which is Picturephone video service, has made it possible to further enhance the versatility of key telephone systems. Unique problems are presented in such systems when the wideband service is extended to the intercom link. For example, in a key telephone system arranged for Picturephone video service, it is possible for two or more video stations to access the common link at the same time, each station transmitting separate images. Since reconstruction of the received data at the terminating station is dependent upon the proper reception of synchronizing (SYNC) signals from the transmitting station, and since these signals will be out of phase with each other when transmitted from different stations, a picture resulting from simultaneous transmission from two or more stations will be unintelligible.

A further problem arises in that the conventional audio-only common link intercom techniques wherein the transmit pairs and the receive pairs of the connected stations are bridged by a talk-back amplifier are not feasible for wideband transmission since the echo suppression equipment necessary under such an arrangement would be extremely sophisticated and uneconomical.

An important feature of existing key telephone systems is the provision for establishing conference connections between a first key station, a line connected to that station and any other key station. In wideband telephone installations, it is desired to provide similar three-party connections. Under such a system, provision must be made to insure that at any one time only two of the stations are interconnected for wideband transmission while all three parties remain connected throughout the call for audio transmission.

Therefore, it is an object of this invention to provide a key telephone system wherein wideband communication paths may be established between any of the stations on an intercom basis without transmission interference between the stations.

It is another object of this invention to provide a key telephone system having a single link intercom for establishing exclusive wideband connections between any two of the stations.

It is still another object of this invention to provide a key telephone system wherein a wideband connection from a line to a called station may be extended in conference fashion between the line, the called station and a station connected to the called station over the intercom link.

SUMMARY OF THE INVENTION

These and other objects are obtained in accordance with one exemplary embodiment of the invention wherein a key telephone system is arranged to provide each key station with access to a wideband single link intercom while at the same time assuring that wideband connections are enabled between only two stations at any one time.

In the embodiment, a key telephone system is arranged with a single link wideband intercom having an audio bus, a wideband transmit bus and wideband receive bus. A station access circuit responds to initiation signals from any station by establishing an audio connection, a wideband transmit connection and a wideband receive connection from the calling station to the respective single link intercom buses. The station access circuit is arranged to enable such connections to the intercom for only one station, a calling station, at a given time. The called station is given access to the link by a separate link control circuit which operates in response to a conventional selective ringing circuit. The link control circuit is arranged to reverse the wideband transmit and wideband receive leads of the called station prior to connecting these leads to the respective common buses of the single link intercom so as to insure that transmission from each station is received at the other station on the respective receive leads.

The system is arranged for three-party video conferencing on an add-on basis between a first station, a line connected to the first station and a second station connected to the first station via the intercom link. On such a conference, all the parties are connected together for continuous audio transmission. However, the direction of the wideband transmission is under exclusive control of the first station and is either between that station and the line or between that station and the second station over the intercom link. This feature is provided by a control circuit which separates the audio bus from the wideband buses. The audio bus is then bridged to the line for continuous audio transmission between all the parties while the wideband buses are separately controlled from the first key station.

In accordance with one feature of the invention, a single link intercom having an audio bus, a wideband transmit bus and a wideband receive bus is arranged among a number of key telephone stations in order to provide audio as well as wideband transmission exclusively between any two of the stations.

In accordance with another feature of the invention, a wideband single link intercom is arranged with control circuitry for matching the transmit and receive wideband lead pairs of a called station with the proper wideband lead pairs of a calling station while insuring that only the called and the calling station have access to the link at any one time.

In accordance with still another feature of the invention, a wideband key telephone system having a single link wideband intercom is arranged for three-party wideband conferencing on an add-on basis between a first station, a line connected to the first station and a second station connected to the first station via the intercom link.

DESCRIPTION OF THE DRAWING

The foregoing objects, features and advantages, as well as others of the invention, will be more apparent from the following description of the drawing, in which.

It will be noted that FIGS. 2 through 13 employ a type of notation referred to as "detached contact" in which an X shown intersecting a conductor represents a normally open contact of a relay and a bar shown intersecting a conductor at right angles represents a normally closed contact of a relay; "-normally" referring to the unoperated condition of the relay. The principles of this type of notation are described in an article entitled "An Improved Detached Contact Type Schematic Circuit Drawing" by F. T. Meyer in the September 1955 publication of the *American Institute of the Electrical Engineers Transactions, Communications and Electronics*, Vol. 74, pages 505-513.

Figure 3:
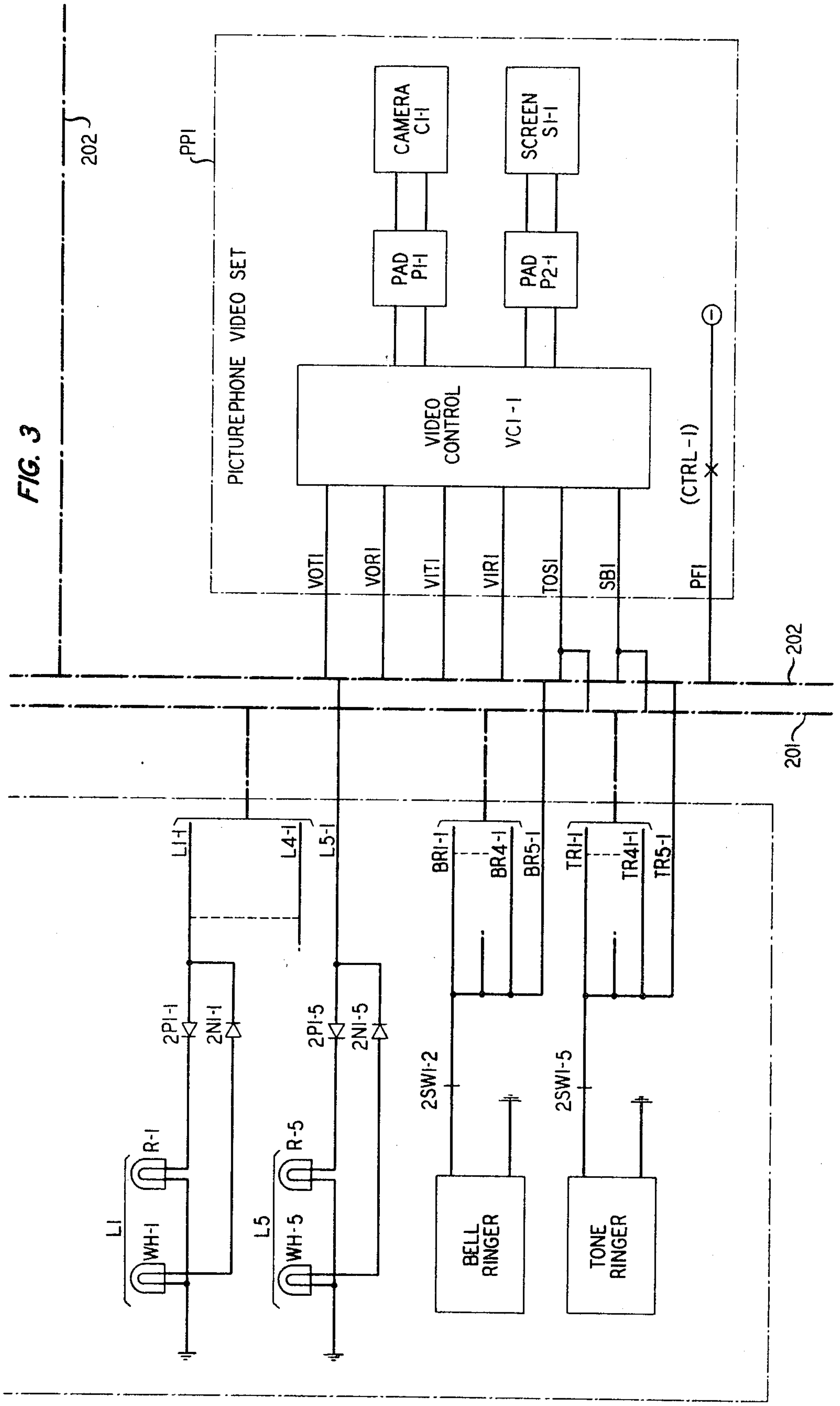
Figure 4:
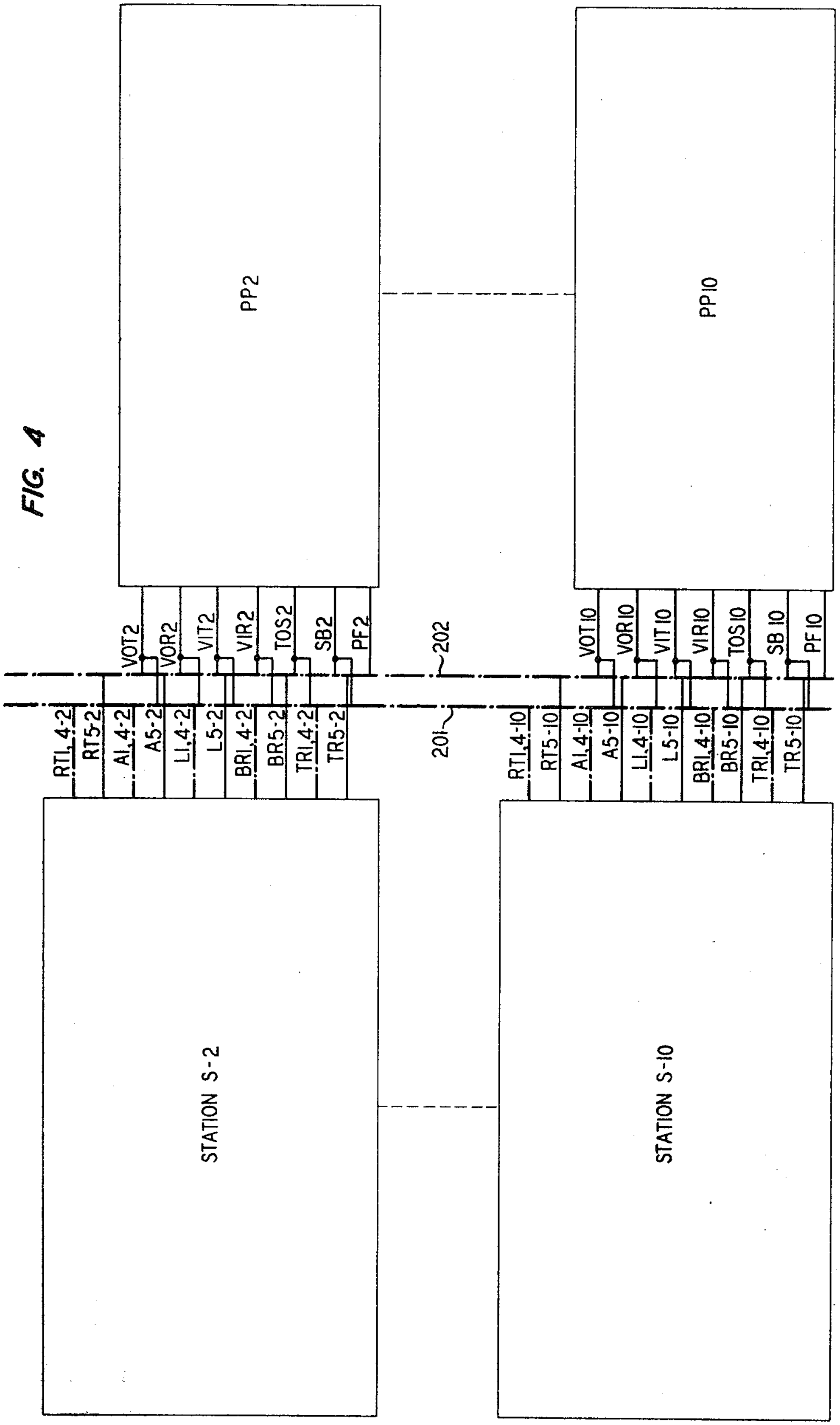
Figure 5:
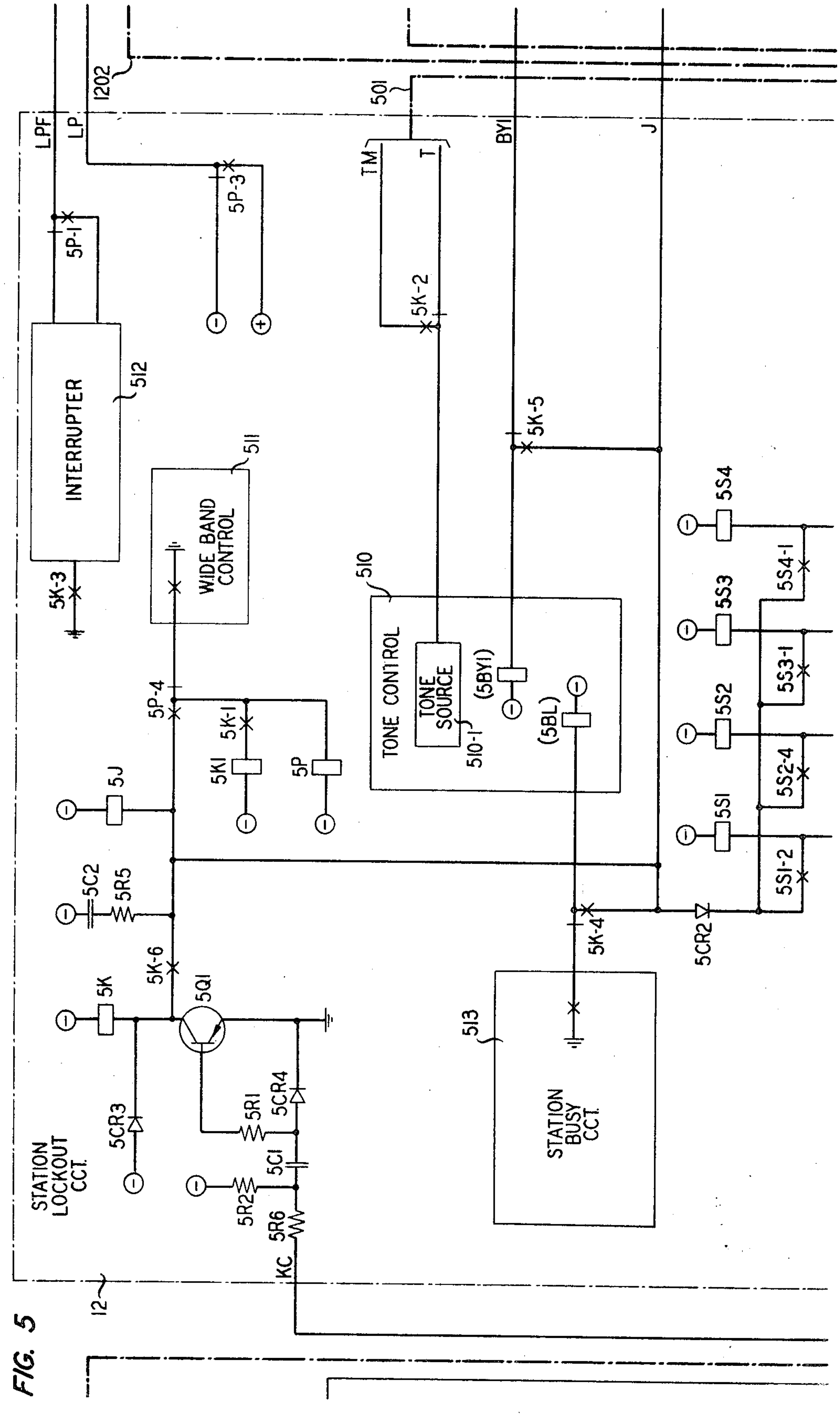

It will be noted also that in order to simplify the disclosure and thus facilitate a more complete understanding of the embodiment, the relays, relay contacts and other electromechanical devices shown in FIGS. 2 through 13 have been given systematic designations. Thus, the number preceding the letters of each device correspond to the figure in which the control circuit of the device is shown. Thus, the coil of relay 5K is shown in FIG. 5. Each relay contact, either make, break or transfer, is shown with its specific contact number preceded by the designation of the relay to which it belongs. For example, the notation 5K-1 indicates contact number 1 of relay 5K the coil of which is shown in FIG. 5.

INTRODUCTION

The present invention is illustrated in a key telephone system wherein any key station may be selectively connected to any one of a number of switching network lines in response to the enabling of a key associated with that line. For purposes of illustration, it is intended that audio-only connections and the audio portion of wideband connections are completed to the key stations from Private Branch Exchange (PBX) or Central Office (CO) lines in a manner well known in the art. One such arrangement is disclosed in the H. T. Carter U.S. Pat. No. 2,850,579, issued Sept. 2, 1958. It will be assumed that the high frequency or data portion of a wideband connection is completed over a wideband quad which consists of a transmit pair of wires and a receive pair of wires. An example of a key telephone system arranged to provide wideband service between any line and any key station is disclosed in copending application of S. E. Bush, P. E. Crouse and G. E. Saltus, Ser. No. 875,261 filed Nov. 10, 1969. It will be assumed further that the intercom arrangement of the present embodiment is a common bus type intercom with selective ringing controlled by the calling station. One such selective intercommunication arrangement is disclosed in the C. E. Morris U.S. Pat. No. 3,450,845, issued June 17, 1969.

In order to further facilitate an understanding of the invention, the description of the operation of the exemplary embodiment has been subdivided into a general description portion designated 1.0 and a detailed description portion designated 2.0. Section 1.0 and its subsections describe the invention in general terms with respect to FIG. 1. Section 2.0 and its subsections describe the invention in detail with respect to FIGS. 2 through 13.

1.0 GENERAL DESCRIPTION

Figure 1:
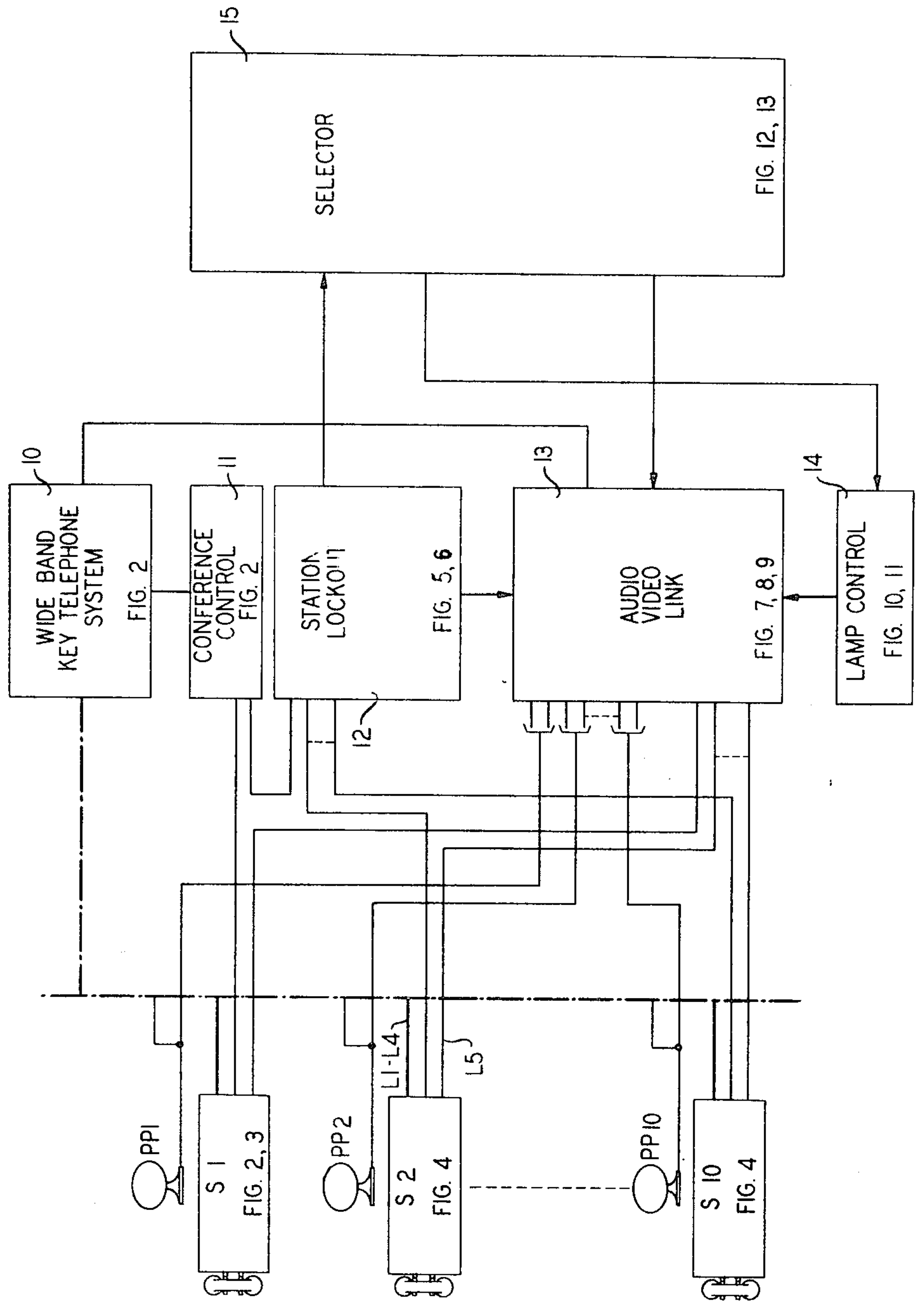
FIG. 1 is essentially a block diagram showing the interrelation of the exemplary embodiment of the invention.

Referring now to FIG. 1, the present invention is illustrated in an audio-video key telephone system having any number of key stations, such as stations S1 through S10. The wideband units PP1 through PP10, which in the embodiment are Picturephone service video telephone sets, are each individually associated with certain ones of the stations.

In the embodiment, each station is arranged with five communication lines (L1-L5); with four of the lines (L1-L4) extended to a conventional key telephone system or to a wideband key telephone system, such as wideband key telephone system 10, and the remaining line (L5), the intercom line, extended to a common audio video-link, such as audio-video link 13.

When it is desired to establish an intercom connection from a station, the pickup key associated with the intercom line at that station is enabled. In addition, on Picturephone service calls, the number key on a Touch-tone dialer is enabled as an indication that wideband service is required. A station lockout circuit, such as station lockout 12, responds to the enabled pickup key by signaling audio-video link 13, in a manner to be more fully detailed hereinafter, so that separate audio, wideband transmit and wideband receive transmission paths are established from the enabling station in a first manner to respective buses of the intercom link. Station lockout 12 is further arranged to prevent any other station from concurrently establishing connections to the intercom link.

The enabling station, upon connection to the intercom link, thereupon dials or key pulses a digit associated with the desired called station. The dialed signals are received by selector circuit 15 which circuit thereupon enables the audio-video link selector control 16 to prepare audible and visual signaling paths to the called station and to prepare a transmission path in a second manner from the intercom link audio bus to the called station. On wideband calls, the audio-video link selector control 16 reverses the wideband transmit and wideband receive transmission paths from the wideband unit associated with the called station and connects these reversed paths to the common wideband transmission buses. Exclusive bidirectional wideband transmission, as well as full audio transmission, is now possible between the calling and called station over the intercom link.

When the wideband intercom system is arranged to work in conjunction with a wideband key telephone system, three-party conferencing is available between a line served by the wideband key telephone system 10, a first station and a second station connected to the first station via the intercom link. Under this arrangement, a conference control circuit, such as conference control 11, is interposed on a line between a first station and the wideband system.

On such conference calls, the audio-video link 13 is arranged to disassociate the control of wideband transmit and wideband receive transmission paths of the first station's intercom line from the control of the audio path of that station. In this situation, bidirectional wideband transmission is either between the first station and the wideband key telephone system 10 or between the first station and the intercom link dependent only upon which of the respective pickup keys is enabled at the first station. The audio path is arranged so that full three-way transmission is possible among all the parties to the conference without regard to which of the pickup keys is enabled at the first station.

In order for a subscriber at a key station to distinguish between audio-only connections and video connections, two distinct signaling systems are utilized. On audio-only calls the visual signals are provided by a white line lamp and the audible signals are generated by a bell ringer. On video calls the visual signals are provided by a red line lamp and the audible signals are generated by a tone ringer.

2.0 DETAILED DESCRIPTION

The following text will describe the embodiment of the invention in detail with reference to FIGS. 2 through 13. Cursory examination of these figures will reveal that certain relay contacts and relay designations have been enclosed in parentheses.

The parenthetical symbol has been employed to facilitate a clear understanding of the invention by indicating that the apparatus which is enclosed therein is shown more fully in prior art telephone systems, such as C. E. Morse, U.S. Pat. No. 3,450,845, dated June 17, 1969. Relay designations and contact designations which are unique to the instant embodiment are not enclosed in parentheses and are shown in complete detail.

We shall assume as hereinbefore set forth that stations S1 through S10 are each arranged for Picturephone service. We shall further assume that each of these stations is arranged with five pickup keys with the first four such keys at each station associated with four lines from a key telephone system, such as wideband key telephone system 10 and the fifth key at each station associated with a single link intercom. However, as will be more apparent from that which is contained hereinafter, any number of stations, each connectable to any number of wideband or audio-only lines, may be connected into the intercom system. Also, it should be noted that a station which is not equipped for wideband service may also access the single link intercom for audio-only communication with any other station regardless of whether the connected station is equipped for wideband service or for audio-only service.

Since the single link wideband intercom is arranged to function with existing key telephone systems and key telephone station equipment, existing control and signaling arrangements have been utilized throughout. For example, connections over any line, including the intercom line, are enabled by the operation of the pickup key associated with that line at each station. The enabling of the pickup key provides a signal on the associated A lead which signal is utilized to establish and control the connection. In addition, the signaling, both audible and visual, of a station which is called on the intercom link is controlled by a dial selective intercom system which responds to dial pulses or to Touch-tone dialing from a calling station. An example of such a system is C. E. Morse, U.S. Pat. No. 3,450,845, dated June 17, 1969. As will be more fully detailed hereinafter, the outputs of the selective intercommunication system are modified on wideband calls so as to enable distinctive signaling on such connections.

2.1 CONNECTION OF A CALLING STATION TO THE INTERCOM LINK

Figure 2:
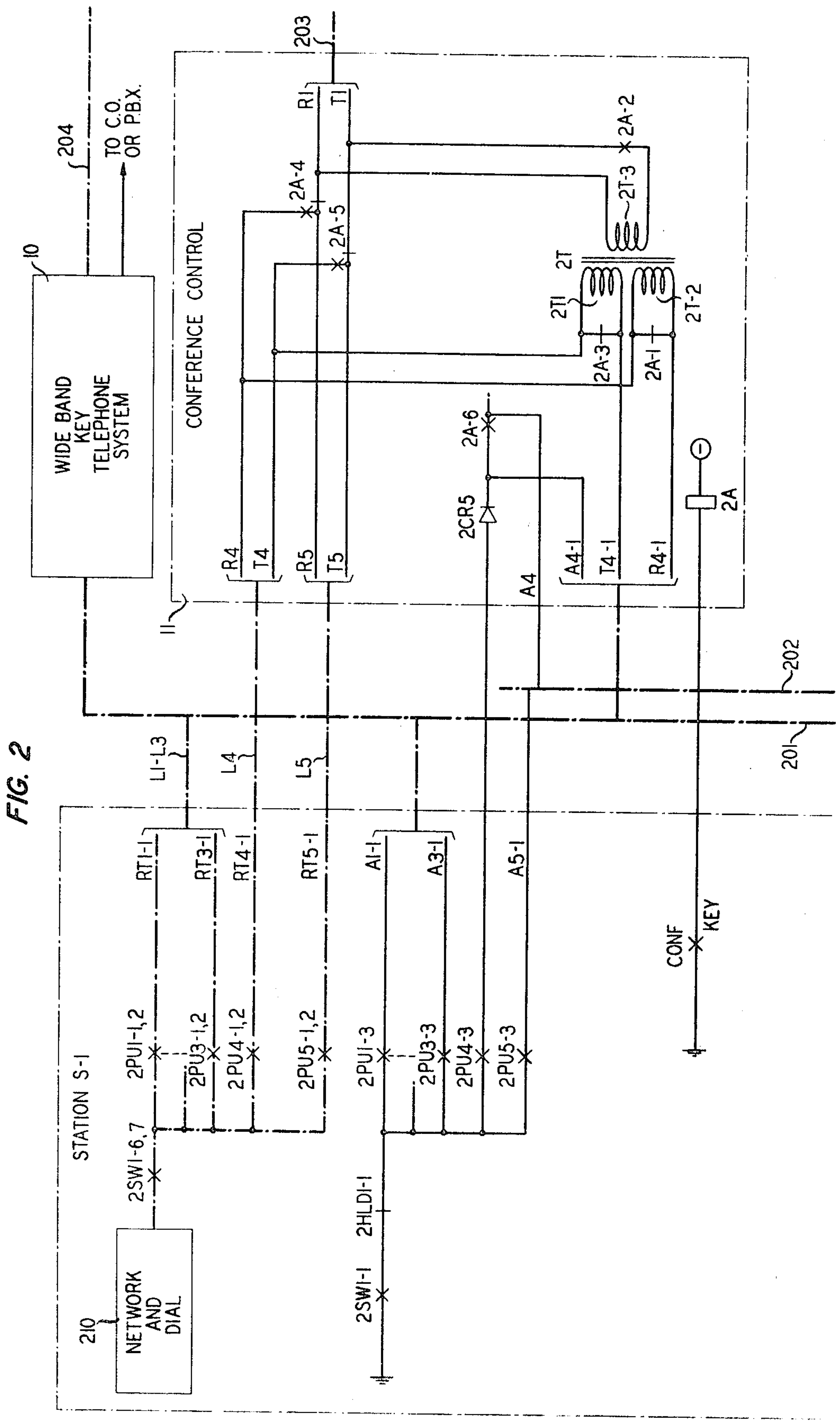
FIGS. 2 through 13 are schematic drawings showing in greater detail the interrelation of the components of the exemplary embodiment.

Turning now to FIG. 2, assume that station S1 desires to establish an intercom connection with station S10 (FIG. 4). Accordingly, the pickup key at station S1 associated with the intercom line, which in the embodiment is pickup key 2PU5, is enabled. Upon removing the handset from the switchhook, ground is extended through enabled switchhook contact 2SW1-1, released hold contact 2HLD-1, enabled pickup key contact 2PU5-3 and over lead A5-1, cable 202 to FIG. 6 and via forward-biased diode 6CR1, released break contact 5J-1 to FIG. 5, thereby operating relay 5S1.

Returning to FIG. 6, it will be noted that the leads A5-1 through A5-10 are each associated with the intercom. Pickup key A lead of each of the stations S1 through S10, which stations are shown in FIGS. 2, 3 and 4. Each of the A leads is associated with an arrangement of diodes such that a ground present on any one of the leads will operate a unique pattern of 5S1 through 5S4 relays. The contacts of the 5S1 through 5S4 relays are arranged to provide a battery on an exclusive one of the leads LK1 through LK10 (FIG. 6) corresponding to a ground on the A lead having the same number. Accordingly, the ground on lead A5-1 enabled the operation of relay 5S1 which thereupon enabled a battery to be extended over lead LK1 to link control relays 7L1-7L10 via enabled make contact 5S1-1, released break contacts 5S2-2, 5S3-2 and 5S4-2 and enabled make contact 5S1-3. Battery on lead LK1 is extended to FIG. 7 and through the coil of link control relay 7L1 to ground on the AB1 (A5-1) lead from FIG. 6. Battery on a selected one of the leads LK1-LK10 provides a first operate path for the corresponding 7L1-7L10 relays, the purpose of which will be more fully appreciated from that which is to follow.

Figure 9:
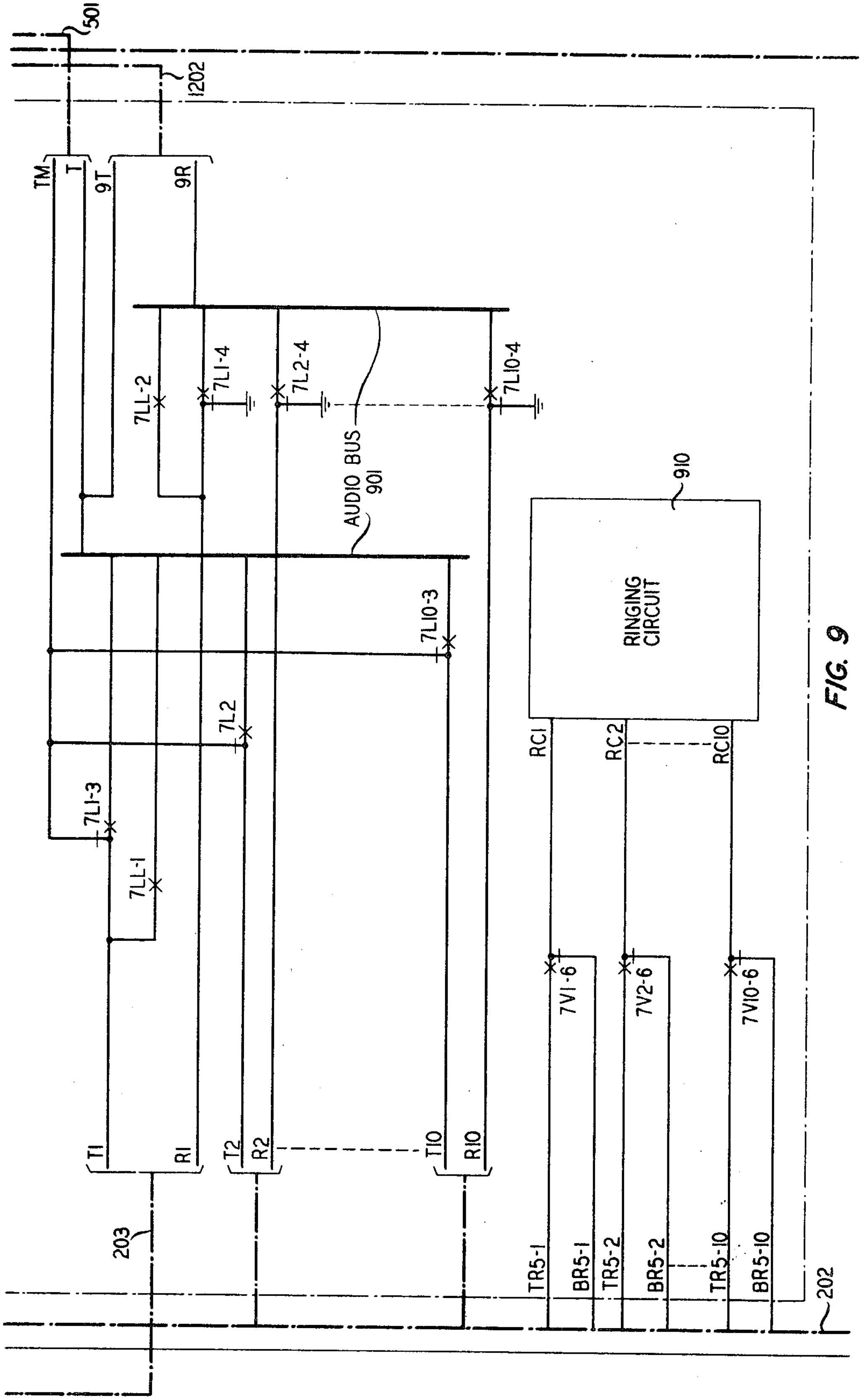

Returning to FIG. 2, the enabling of intercom pickup key 2PU5 at station S1 also establishes a two-wire transmission path between the network and dial circuit 210, enabled switchhook contacts 2SW1-6 and 2SW1-7, enabled pickup key contacts 2PU5-1 and 2PU5-2, cable RT5-1 to conference control circuit 11 and through the conference circuit via released break contacts 2A-4 and 2A-5, over leads R1 and T1, cable 203 to FIG. 9.

Continuing in FIG. 9, the transmission path is then extended through enabled make contacts 7L1-3 and 7L1-4 to the two-wire audio bus 901. Audio bus 901 is extended via leads 9T and 9R and cable 1202 to FIG. 12 and through coils (78) and (80) and resistors (76) and (82) to battery and ground, respectively. Accordingly, as well known in the art, these elements serve as the source of talking battery for the audio transmission bus 901.

Figure 12:
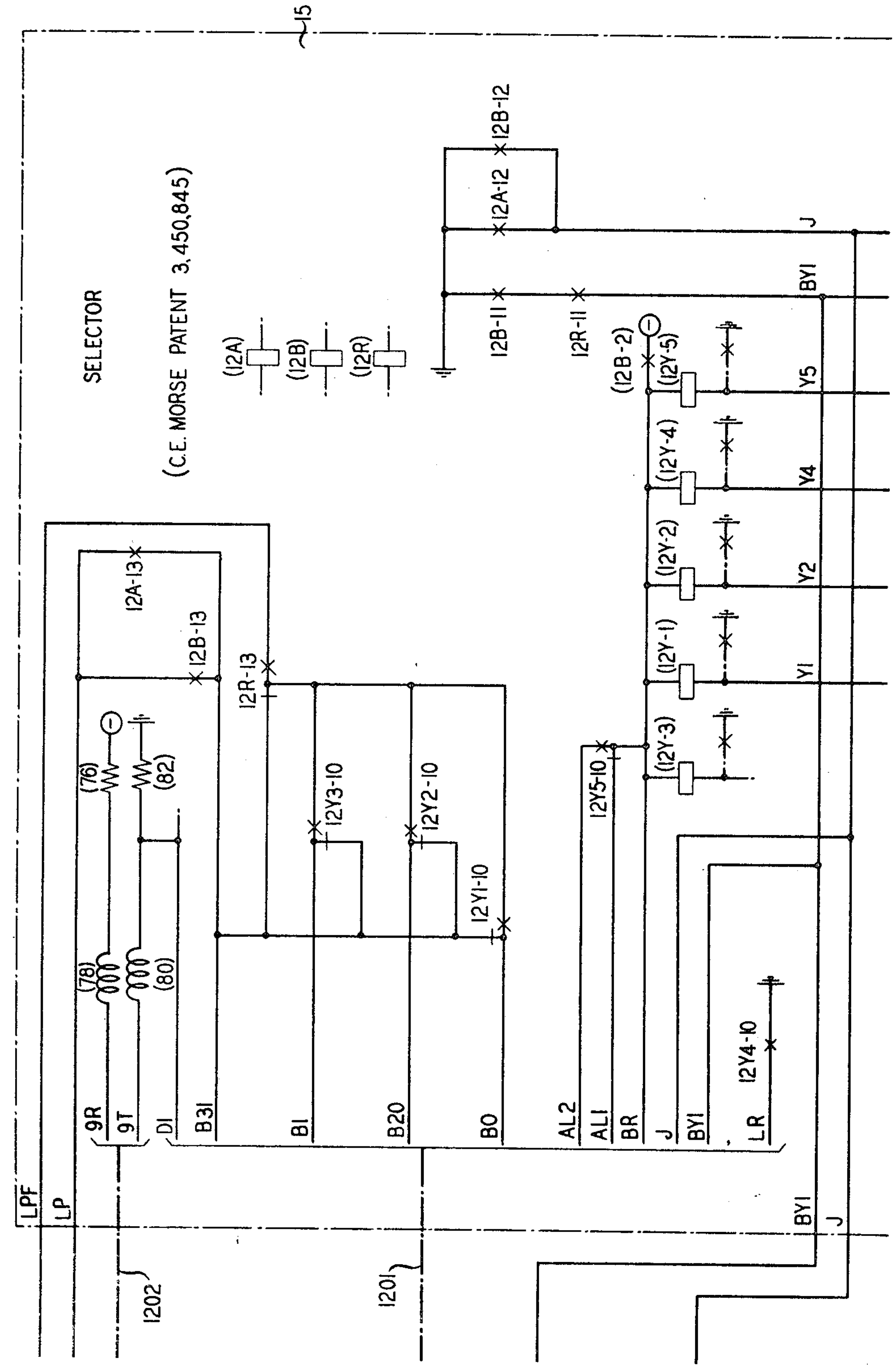

Continuing in FIG. 12, the circuit shown therein (selector 15) operates in the manner set forth in the above-mentioned C. E. Morse patent so that relay (12A) is enabled at this time. Ground is thereupon extended via enabled make contact 12A-12 and lead J to FIG. 5 and through forward-biased diode 5CR2 (FIG. 5) and enabled make contact 5S1-2 to provide a hold path for enabled relay 5S1. Ground from the J lead is also extended to the coil of relay 5J and through the coil to battery thereby operating relay 5J.

Figure 6:
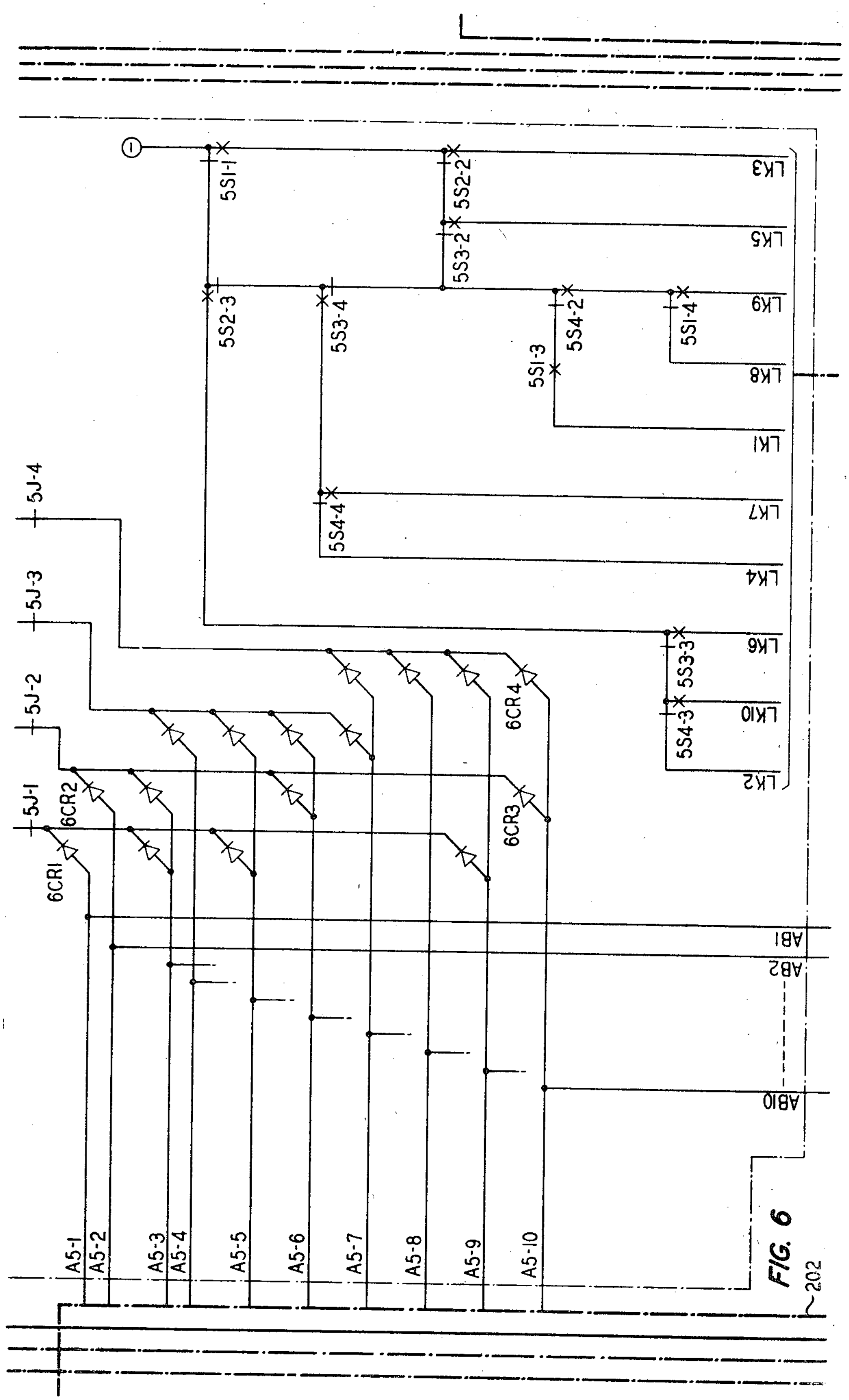

Turning now to FIG. 6, the enabling of relay 5J opens the operate path of each of the relays 5S1 through 5S4 (FIG. 5) via enabled break contacts 5J-1, 5J-2, 5J-3 and 5J-4, respectively. Accordingly, at this point ground appearing on any of the A5-1 through A5-10 leads signifying the enabling of the intercom pickup key at the corresponding stations S1 through S10 will not change the unique pattern of operated 5S1 through 5S4 relays. Therefore, the link control relays 7L1 through 7L10 (FIG. 7) which receive battery via leads LK1 through LK10 will continue to be operated in response to the original unique pattern of 5S1 through 5S4 relays without regard to the status of the A leads from the other stations. Accordingly, only one station at a time may initiate a connection to the audio-video intercom link.

Figure 11:
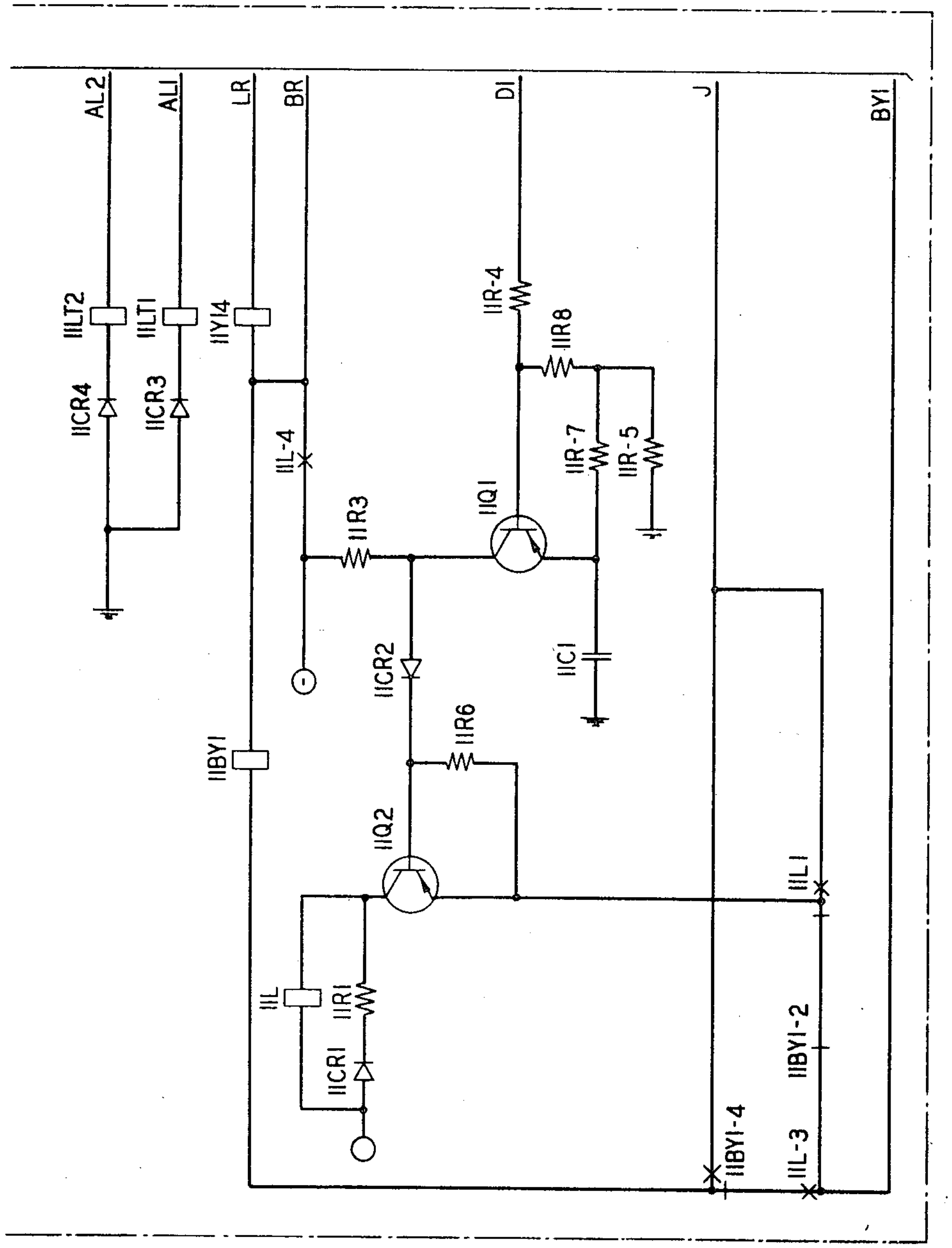

Turning again to FIG. 12, the voltage drop across resistor (82) is extended via lead D1 and cable 1201 to FIG. 11 and through resistor 11R-4 (FIG. 11) to operate transistor 11Q1 in the well-known manner. The enabling of transistor 11Q1 provides base potential for the subsequent operation of transistor 11Q2.

2.2 ENABLING OF A VIDEO CONNECTION

In the event the desired intercom connection is to be a Picturephone instrument connection, one of the extra buttons, such as the number button on the Touch-tone dial (FIG. 2) is enabled prior to the dialing of the intercom number of station S10.

Turning to FIG. 5, assuming that the number button had been operated to signify a Picturephone or wideband connection, wideband control 511, which may comprise any one of a number of circuit configurations well known in the art operable to provide a ground in response to certain dialed or key pulsed digits, provides a ground which is extended through released break contact 5P-4 to operate relay 5P. Once enabled, relay 5P locks operated via now enabled transfer contact 5P-4 to the J ground extended from FIG. 12.

Figure 7:
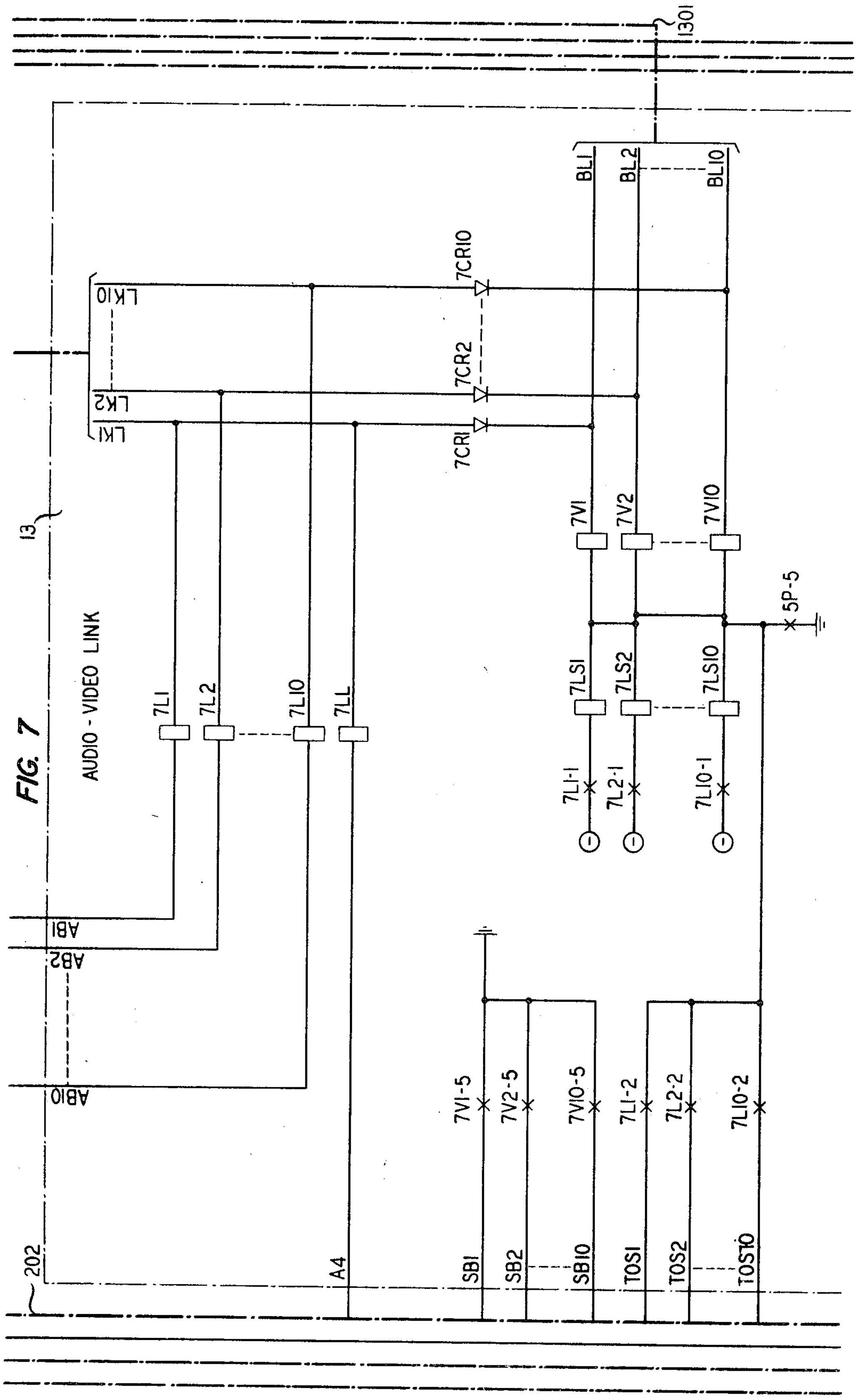

Turning now to FIG. 7, the enabling of relay 5P extends a ground through enabled make contact 5P-5 to the coil of relay 7LS1 and through the coil to battery via enabled make contact 7L1-1, thereby enabling relay 7LS1. Ground is also extended through the coil of relay 7V1 which relay does not operate because diode 7CR1 is reverse-biased at this point. Ground is also extended from enabled make contacts 5P-5 and 7L1-2, over lead TOS1 and cable 202 to FIG. 3 as a turnon signal to video control VC1-1 in Picturephone video set PP1. Continuing in FIG. 3, video control VC1-1 is arranged in any one of the well-known circuit configurations to warm up the associated video set, when such warm-up is necessary, upon the application of ground on a particular lead, such as lead SB1. In addition, the video control circuit is further arranged to initiate signal transmission over leads VOT1 and VOR1 and signal reception over leads VIT1 and VIR1 upon the application of ground on another lead, such as lead TOS1. Accordingly, ground on lead TOS1 has established a video quad transmission path from video set PP1, leads VOT1, VOR1, VIT1 and VIR1 and cable 202 to FIG. 8. The transmit and receive pairs of the video quad are individually extended through the released break contacts of the 7V1 relay and through enabled make contacts 7LS1–1, 7LS1–2, 7LS1–3 and 7LS1–4 to the respective transmission quad terminating resistors 8R3 and 8R4 via released break contacts 5K1–1, 5K1–2, 5K1–3 and 5K1–4. It should be noted that the transmit leads VOT1 and VOR1 from video set PP1, are now associated with the video transmit bus 801, while the video receive leads VIT1 and VIR1 are now associated with the video receive bus 802.

Summarizing briefly at this point, the enabling of the intercom key at station S1 has enabled audio link relay 7L1 so as to extend the audio transmission path of station S1 to the common intercom audio bus 901. In conjunction therewith, the enabling of the number key at station S1 has enabled separate video transmit and video receive paths to be established in a first manner from Picturephone video set PP1 through enabled contacts of video link relay 7LS1 to the common transmit and receive buses 801 and 802 respectively of the intercom link.

2.3 SELECTION AND SIGNALING OF A CALLED STATION

Turning again to FIG. 2, the subscriber at station S1 now dials or key pulses the intercom number of the desired station, which in our example is station S10. Accordingly, the digits corresponding to the number 10 are transmitted via the transmission path previously described which extends from station S1 via leads RT5–1 through conference control 11 to FIG. 9 and through the enabled make contacts of relay 7L1 and over leads 9T and 9R to FIG. 12.

Continuing in FIG. 12, relays (12Y1) through (12Y5) are arranged in a manner set forth in the aforementioned Morse patent to follow the dial pulses or to be operated in response to Touch-tone signals so that the final combination of enabled relays is uniquely associated with the dialed digit. Since in our example station S10 is the called station, at the completion of the dialing interval relays (12Y2) and (12Y5) are enabled. Grounds are thereby provided over leads Y2 and Y5 to FIG. 13 and via forward-biased diodes 13CR2 and 13CR5 to operate relays 13Y2 and 13Y5 to battery via enabled make contact 13LT–1 of relay 13LT which relay has operated previously via the J ground from FIG. 12 and forward-biased diode 13CR6. At this time, relay 13G operates from ground on the BY1 lead from FIG. 12. (Relays (12B) and (12R) are operated at this point). Relay 13G operating, provides a hold path for the operated ones of the 13Y1–13Y5 relays and opens the operate paths of each of those relays via transfer contacts 13G–1, 13G–2, 13G–3 and 13G–5.

Figure 13:
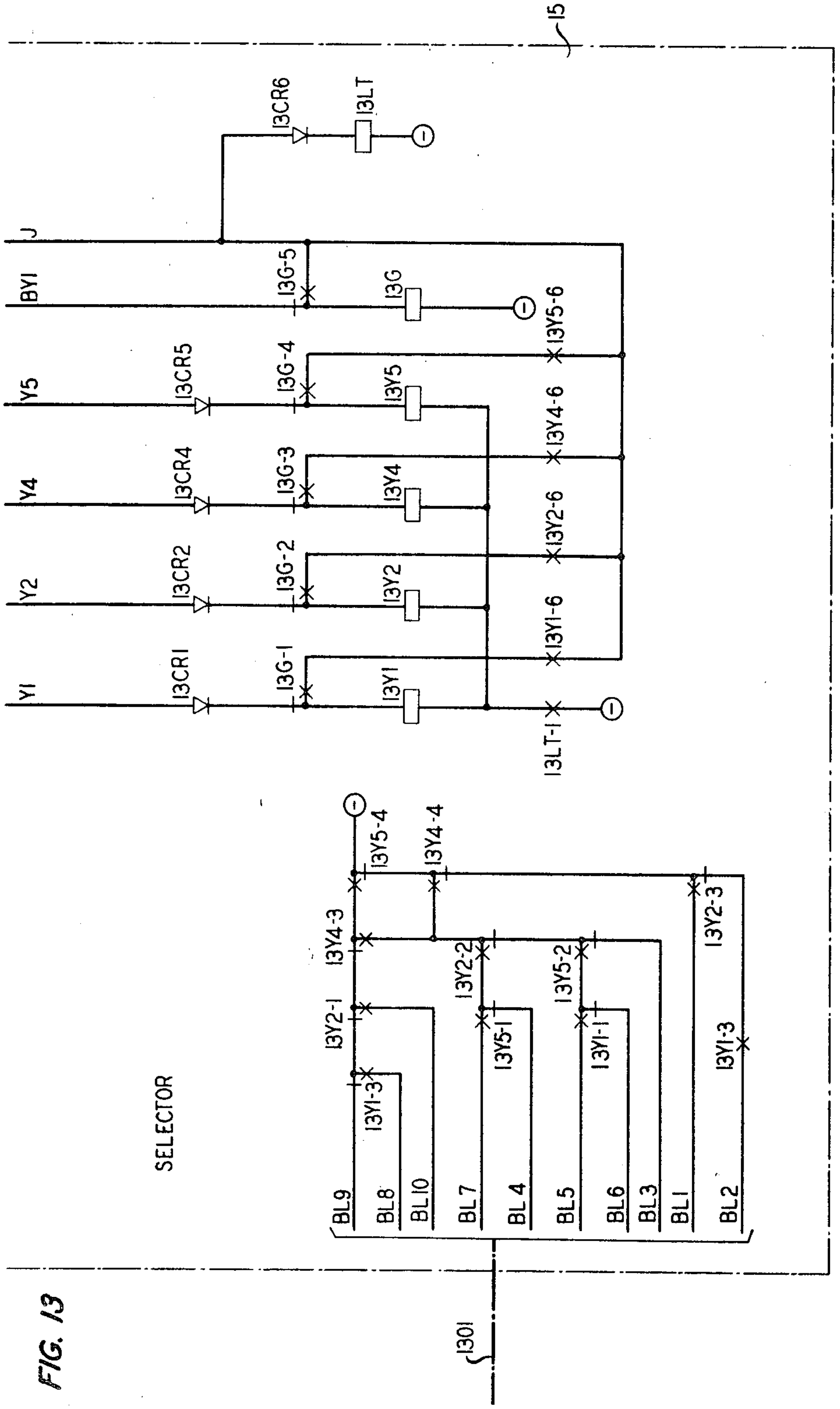
Figure 14:
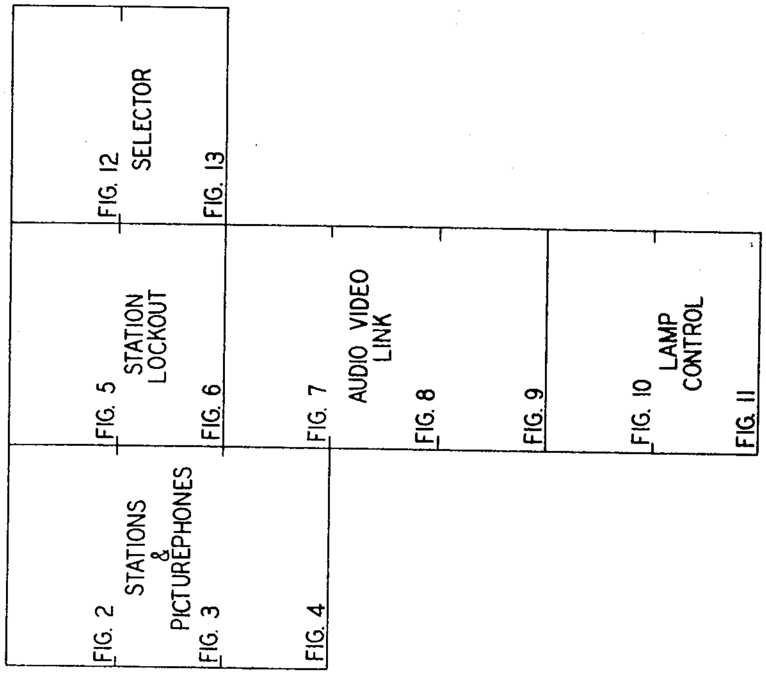
FIG. 14 shows the manner in which the other figures should be arranged.

Continuing in FIG. 13, the enabling of relays 13Y2 and 13Y5 provide a battery via enabled make contact 13Y5–4, released break contact 13Y4–3 and enabled make contact 13Y2–1, over lead BL10 and cable 1301 to FIG. 7, which battery is extended to the coil of relay 7V10 and also provides a second operate path for the link control relay 7L10 through forward-biased diode 7CR10 to relay 7L10. Relay 7V10 which, as will be seen from that which is to follow, is a transmission reversing relay and operates at this point to ground via enabled make contact 5P–5. The enabling of relay 7V10 extends a ground via enabled make contact 7V10–5 and lead SB–10 over cable 202 to FIG. 4 video telephone set PP10 as a standby signal thereto.

Figure 8:
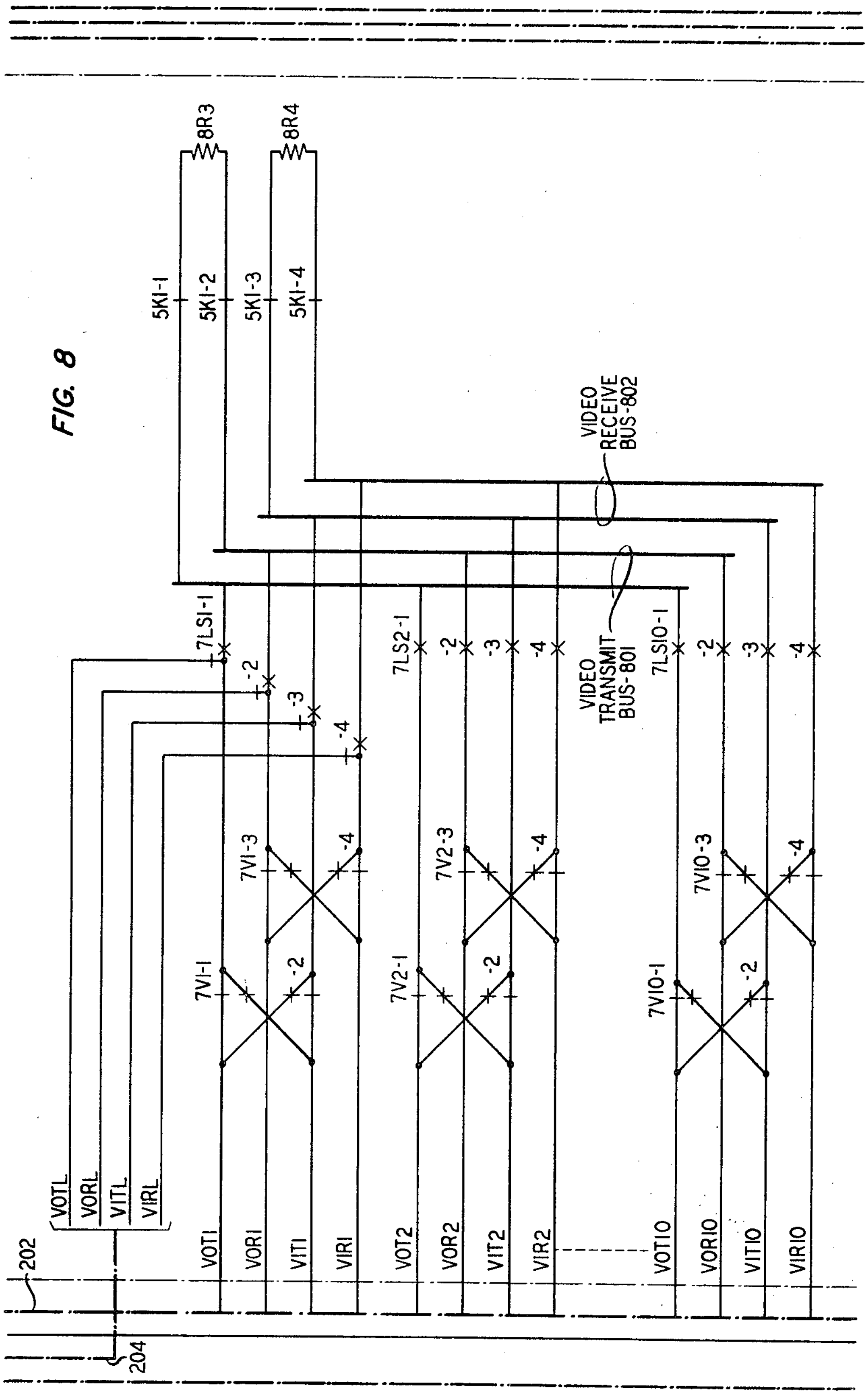

Turning now to FIG. 8, the enabling of relay 7V10 enables the reversal of the video quad leads VOT10, VOR10, VIT10 and VIR10 extended from Picturephone video set PP10, such that video signals received from video set PP10 on video transmit leads VOT10 and VOR10 which would normally be connected to the video transmit bus 801 are reversed for subsequent connection to the video receive bus 802 while the video receive leads VIT10 and VIR10 which would normally be connected to the video receive bus 802 are reversed for subsequent connection to the video transmit bus 801. This reversal is accomplished by enabled transfer contacts 7V10–1, 7V10–2, 7V10–3 and 7V10–4.

Turning again to FIG. 12, as discussed previously, at the completion of the dialing interval relays (12B) and (12R) are enabled, thereby providing a ground on lead BY1 which is extended via cable 1201 to FIG. 11 and through released break contacts 11BY1–2 and 11L–1 to enable transistor 11Q2 in the well-known manner, thereby enabling relay 11L.

Figure 10:
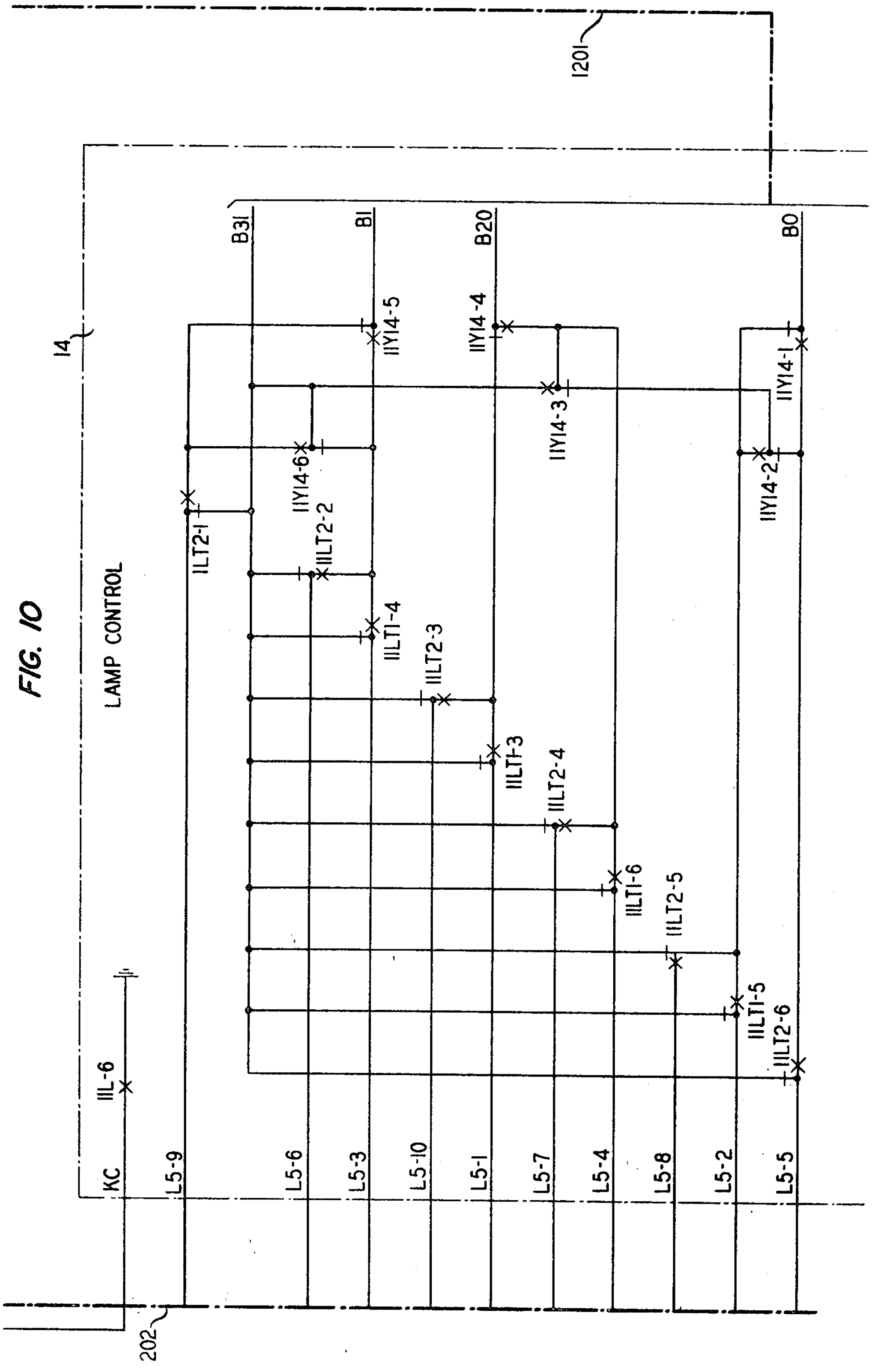

Turning now to FIG. 10, the enabling of relay 11L provides a ground via enabled make contact 11L–6 and lead KC to FIG. 5 and through resistor 5R6, thereby charging capacitor 5C1 and turning on transistor 5Q1. Relay 5K operates from enabled transistor 5Q1 and locks operated through enabled make contact 5K–6 to the J ground extended from FIG. 12. The enabling of relay 5K also enables relay 5K1 via enabled make contact 5K–1. As shown in FIG. 8, the operation of the 5K1 relay removes the resistive terminations of the respective video transmit and video receive buses 801 and 802 via the operation of break contacts 5K1–1, 5K1–2, 5K1–3 and 5K1–4.

Returning to FIG. 5, positive potential is extended via enabled make contact 5P–3 over lead LP to FIG. 12 and through enabled make contact 12B–13 and over lead B31 and cable 1201 to FIG. 10 and through released break contacts of the 11LT2 and 11LT1 relays and over the L5–1 through L5–10 leads to all the stations as an indication that the intercom link is busy. For example, positive potential on lead B31 is extended through break contact 11LT1–3, lead L5–1 and cable 202 to FIG. 3 and via forward-biased diode 3P1–5 to illuminate the red lamp R–5 associated with line 5 of station S1. Similarly, the red lamps associated with the intercom lines at each of the other stations S2 through S10 are now lighted. It should be noted that if the desired intercom connection was not a video telephone connection, negative potential would have been extended from FIG. 5, released transfer contact 5P–3, thereby lighting the white lamp WH–5 via diode 3N1–5.

Turning again to FIG. 12, it should be noted that the positive potential extended from FIG. 5 over the LP lead is also extended through normal transfer contacts 2Y3–10 and 12Y1–10 and over the Bo and B1 leads respectively and cable 1201 to FIG. 10. Positive potential on leads B0 and B1 is extended through the lamp control circuit 14, FIG. 10, to all the lamp leads L5-1 - L5-9 so as to indicate a busy condition on the intercom link to all stations except the called station S10.

Continuing in FIG. 12, battery via enabled make contacts (12B–2) and 12Y5–10 is extended over lead AL2, cable 1201 to FIG. 11, thereby enabling relay 11LT2. The operation of relay 11LT2 prepares an operate path for certain of the supervisory lamps in the manner detailed hereinafter.

Returning again to FIG. 5, the enabling of relay 5K also provides a ground to interrupter 512 via enabled make contact 5K–3. Interrupter 512 may be arranged in any one of the well-known circuit configurations operable to provide positive or negative pulsating potentials on each of two leads in response to a ground applied thereto. Accordingly, pulsating positive potential is extended via enabled make contact 5P–1 and lead LPF to FIG. 12 and via enabled make contact 12R–13 and enabled make contact 12Y2–10 and lead B20, cable 1201 to FIG. 10 and through released break contact 11Y14–4 and enabled make contact 11LT2–3 to lead L5–10 and via cable 202 to FIG. 4 to light, in a pulsating manner, the red lamp (not shown but identical with the similar element shown in FIG. 3 for station S1) associated with the intercom line at station S10. At the same time ringing circuit 910, shown in FIG. 9, provides ringing potential in the well-known manner on lead RC10. This potential is extended through enabled make contact 7V10–6 and over lead TR5–10 and cable 202 to FIG. 4 thereby enabling the tone ringer at station S10 (not shown, but identical with the similar element shown in FIG. 3 for station S1) in a distinctive manner so as to inform the subscriber at station S10 that a Picturephone video connection directed thereto is waiting on the intercom link.

Returning again to FIG. 5, ground on the J lead from FIG. 12 is extended through enabled break contact 5K–5 to operate the (5BY1) relay in tone control 510. Tone control 510 is arranged in any one of the well-known circuit configurations to provide various audible tones, such as dial tone and busy tone, upon the operation of certain relays therein. Accordingly, tone source 510–1 provides busy tone through enabled make contact 5K–2, lead 5TM and cable 501 to FIG. 9 and one of the transmission leads of each of the stations, except the calling station. Enabled transfer contact 7L1–3 prevents busy tone from being transmitted to calling station S1 at this time.

2.4 ESTABLISHMENT OF EXCLUSIVE TRANSMISSION PATHS BETWEEN THE CALLING AND THE CALLED STATIONS

Turning now to FIG. 4, the subscriber at station S10, in response to the audible and visual signals transmitted thereto, removes the handset from the switchhook (not shown) and enables the intercom key (not shown). Accordingly, ground is transmitted over the A5–10 lead and cable 202 to FIG. 6. It should be noted that the ground on lead A5–10 (FIG. 6) cannot, as discussed previously, be extended through diodes 6CR3 and 6CR4 to the 5S2 and 5S4 relays due to enabled break contacts 5J–2 and 5J–4 respectively.

Ground on the A5–10 lead, however, is extended at this time over lead AB10 to FIG. 7 and through the coil of relay 7L10 to battery which has been extended, in a second manner as previously set forth, through forward-biased diode 7CR10 and lead BL10, cable 1301 from FIG. 13. Relay 7L10 operates at this time thereby enabling relay 7LS10 via enabled make contact 7L10–1 to battery.

At the same time, ground is extended via enabled make contacts 5P–5 and 7L10–2 over lead TOS10 and cable 202 to FIG. 4 to turn on video set PP10 in the manner previously set forth for video set PP1 (shown in FIG. 3). The video quad leads from sets PP10, VOT10, VOR10, VIT10, VIR10 are extended via cable 202 to FIG. 8 and are reversed therein, as discussed previously, by the enabled transfer contacts of 7V10. The transposed video pairs are then extended through now enabled make contacts 7LS10 to the respective buses.

Summarizing at this point, wideband transmission from Picturephone video set PP1 (FIG. 3) is extended over wideband leads VOT1 and VOR1, cable 202 to FIG. 8 and through released break contacts 7V1–1 and 7V1–3 and enabled make contacts 7LS1–1 and 7LS1–2 to the video transmit bus 801. Also connected to the video transmit bus 801 at this time are the receive leads VIT10 and VIR10 from video set PP10 which have been extended through enabled make contacts 7LS10–1 and 7LS10–2 and enabled transfer contacts 7V10–1 and 7V10–3. In similar manner, video transmission from video set PP10 originates on leads VOT10 and VOR10 (FIG. 4) and is extended via cable 202 to FIG. 8 and through enabled transfer contacts 7V1–2 and 7V10–4, enabled make contacts 7LS10–3 and 7LS10–4 to video receive bus 802. Also connected to the video receive bus 802 at this time are the receive leads VIT1 and VIR1 of video set PP1 which have been extended through enabled make contacts 7LS1–3 and 7LS1–4 and released transfer contacts 7V1–2 and 7V1–4. Accordingly, bidirectional wideband transmission is now possible between station S1 and S10.

The audio transmission path from station S1 (FIG. 2) extends from network and dial 210, enabled switchhook contacts 2SW1–6 and 2SW1–7, enabled pickup key contacts 2PU5–1 and 2PU5–2 and lead RT5–1, through conference control circuit 11, leads R1 and T1 and over cable 203 to FIG. 9 and enabled make contacts 7L1–3 and 7L1–4 to the audio bus 901. Also connected to the audio bus at this time is the audio transmission path from station S10 which has been extended over leads T10 and R10, enabled make contacts 7L10–3 and 7L10–4. Talking potential is supplied to the audio transmission bus 901 over leads 9T and 9R and cable 1202 from FIG. 12 coils (78) and (80) the manner discussed previously.

2.5 CONNECTION OF A WIDEBAND LINE TO A STATION CONNECTED TO THE INTERCOM LINK

Turning now to FIG. 2, let us assume that it is desired to establish a three-party conference between station S1, wideband line 4 (the audio portion of which is shown as RT4–1 in station S1) from wideband key system 10 and station S10 connected to station S1 via the intercom link. Under these conditions the subscriber at station S1 enables pickup key 2PU4 thereby extending a ground through enabled make contact 2PU4–3 to conference control 11, forward-biased diode 2CR5, lead A4–1 and cable 201 to wideband key system 10. Audio transmission is thereupon possible between station S1, via network and dial 210, enabled switchhook contacts 2SW1–6, 2SW1–7, enabled pickup key contacts 2PU4–1 and 2PU4–2, transmission pair RT4–1 to conference control 11, through released break contacts 2A–3 and 2A–1, leads T4–1 and R4–1 and cable 201 to wideband system 10.

Turning now to FIG. 3, wideband transmission between station S1 and wideband key system 10 is now possible via transmission quads VOT1, VOR1, VIT1, VIR1 from video set PP1 and cable 202 to FIG. 8 and through the released transfer contacts of the 7U1 relay and through the now released transfer contacts of the 7LS1 relay and leads VOTL, VORL, VITL and VIRL and cable 204 to FIG. 2 wideband key system 10.

Digressing momentarily, it should be noted that although station S1 is no longer associated with the intercom link, the intercom control system is maintained under control of the called station S10 since selector circuit 15 (FIG. 12), which controls the J ground, is controlled by the audio bus 901 (FIG. 9) connected to station S10. Therefore, as long as either party to an intercom connection remains off-hook with the intercom pickup key operated, the intercom connection is maintained. However, when either party releases the intercom pickup key, or goes on-hook, the ground on the associated A5– lead is removed. In our example, since station S1 has now operated the pickup key associated with line 4, the ground on lead A5–1 to FIG. 6 (and on lead AB1 to FIG. 7) has been removed. Accordingly, relay 7L1 releases at this point thereby releasing relay 7LS1. Accordingly, the wideband quad from Picturephone video set PP1 is removed from the respective buses 801 and 802 (FIG. 8) via now released transfer contacts 7LS1–1, 7LS1–2, 7LS1–3 and 7LS1–4. The audio transmission path is also removed from the audio bus 901 (FIG. 9) via now released transfer contacts 7L1–2 and 7L1–4.

When it is desired to establish a three-party conference, the subscriber at station S1 (FIG. 2) enables the conference key thereat, thereby enabling relay 2A in conference control 11. The enabling of relay 2A extends the A lead ground from diode 2CR5 through enabled make contact 2A–6 over lead A4, cable 202 to FIG. 7 and through relay 7LL to battery on lead LK1 from FIG. 6, which battery had been extended as discussed previously, in response to the intercom link selection from station S1.

Returning again to FIG. 2, an audio transmission path has now been established from station S1 network and dial 210, enabled switchhook contacts 2SW1–6 and 2SW1–7, enabled pickup key contacts 2PU4–1 and 2PU4–2, lead RT4–1 to conference control 11 and via enabled make contacts 2A–4 and 2A–5 to individual windings 2T–1 and 2T–2 of transformer 2T. Each wire of the transmission pair is extended through a separate winding of the transformer in the well-known manner and is connected to line 4 of wideband key telephone system 10 via leads T4–1 and R4–1 and cable 201. Audio transmission is thereby possible at this time between station S1 and line 4 of wideband key telephone system 10. At the same time, coils 2T1 and 2T2 of transformer 2T in conference control 11 are arranged in the well-known manner to inductively couple transmission to coil 2T–3 which transmission is thereby extended through enabled make contact 2A–2, leads R1 and T1 and cable 203 to FIG. 9.

Turning now to FIG. 9, the enabling of relay 7LL provides an audio path from the audio transmission pair T1 and R1 from conference control 11 through enabled make contacts 7LL-1 and 7LL-2 to the audio bus 901. Accordingly, audio transmission is possible from station S1 and from line 4 of wideband key telephone system 10 to the common audio bus 901 and via the bus through enabled make contact 7L10-3 and 7L10-4 to the audio transmission leads T10 and R10 of station S10 even though the pickup key at station S1 is operated on line 4 and not on the intercom line 5. In addition, as discussed previously, two-way video transmission is now possible between station S1 and line 4 of wideband key telephone system 10. Station S10 has been eliminated from the wideband connection via released make contacts of the 7LS1 relay, FIG. 8. However, as set forth previously, continuous audio communication between station S1, station S10 and line 4 is maintained for conference purposes.

When the subscriber at station S1 desires to re-establish video communications with station S10, the intercom pickup key at station S1 is enabled. Accordingly, as shown in FIG. 2, ground is removed from the A4 lead and extended over the A5-1 lead, cable 202 to FIG. 6 and over the AB-1 lead to re-enable relay 7L1 thereby re-enabling relay 7LS1.

Turning now to FIG. 8, video communication from station S1 over video quads VOT1, VOR1, VIT1 and VIR1 is now extended to the video transmit bus 801 and video receive bus 202 via the now enabled make contacts of relay 7LS1 while video transmission is inhibited from being transmitted to wideband key telephone system 10, cable 204, leads VOTL, VORL, VITL and VIR1 via the now enabled break contacts of relay 7LS1. Accordingly, wideband key telephone system 10 has been eliminated from the wideband portion of the connection. However, audio transmission from station S1 is extended to conference control 11 (FIG. 2) via enabled pickup key contacts 2PU5-1, 2PU5-2 and cable RT5-1 and through enabled make contacts 2A-4 and 2A-5 to the coils of transformer 2T and through the coils to the wideband key telephone system 10 and to the intercom bus and station S10 in the manner previously described. Accordingly, continuous audio transmission between station S1, station S10 and wideband key telephone system 10 will be maintained in conference fashion.

2.6 CONCLUSION

While the equipment of the invention has been shown in a particular embodiment wherein a group of key telephone stations have been arranged for video connections exclusively between two selected stations, it is understood that such an embodiment is intended only to be illustrative of the present invention and numerous other arrangements may be devised by those skilled in the art without departing from the spirit and scope of the invention.

For example, some or all of the key stations could be replaced by computer terminals arranged to supply information to any of the other stations or computers over a common link. Under these conditions, the intercom connection could be initiated either from one of the key telephone stations or from one of the computers.

What is claimed is:

1. In a communication system at least first, second and third stations each including means for transmitting and for receiving wideband signals, an intercom link common to said stations, said intercom link including first and second buses, first manner connectable means normally operable for connecting said wideband transmitting means of said stations to said first bus of said intercom link and for connecting said wideband receiving means of said stations to said second bus of said intercom link, and second manner connectable means operable in response to a calling one of said stations for connecting said wideband transmitting means of a selected other one of said stations to said second bus of said intercom link and for connecting said wideband receive means of said other station to said first bus of said intercom link whereby exclusive bidirectional wideband transmission over said intercom link is enabled between said calling station and said selected other station.

2. The invention set forth in claim 1 further comprising means responsive to the enabling of said first manner connectable means from said calling station for inhibiting the enabling of said first manner connectable means from other than said calling station.

3. The invention set forth in claim 2, wherein said intercom link further includes an audio bus and wherein a bidirectional audio connection is established from said calling station and from said selected other station to said audio bus concurrently with said enabling of said bidirectional wideband transmission.

4. In a communication system, the combination in accordance with claim 1 wherein said means responsive to a calling one of said stations includes link control means, means responsive to said calling station for operating said link control means over a first path for enabling said first manner connectable means from said calling station, and means responsive to selection signals from said calling station for operating said link control means over a second path to enable said second manner connectable means from said selected other station.

5. The invention as set forth in claim 4 wherein said calling station responsive means further includes means for inhibiting the concurrent operation of said link control means from more than one calling station.

6. The invention as set forth in claim 5 wherein said link control means includes link relays selectively operable over both said first and said second paths, said link control means further including transmission path reversing relays operable in parallel with said link relays when said link relays are operated over said second path.

7. In a key telephone system wherein connections are established between any one of a number of stations and any one of a number of lines in response to the enabling of a key associated with a selected one of said lines at an enabling one of said stations and wherein one of said lines is arranged as an intercom link between said stations, said intercom link including first and second buses, the combination comprising intercom link control means, means responsive to the enabling of said key associated with said intercom line at a calling one of said stations for operating said intercom link control means over a first path for connecting said calling station to said intercom link in a first manner so that a transmitting connection is established between said calling station and said first link bus and a receiving connection is established between said calling station and said second link bus, and means responsive to selection signals from said calling station for operating said link control means over a second path to prepare a second manner connection so that a transmitting connection between a selected other one of said stations and said second intercom link bus and a receiving connection between said selected other station and said first intercom link bus is prepared.

8. The invention set forth in claim 7 wherein said calling station responsive means further includes means for inhibiting the concurrent operation of said link control means in said first manner from more than one said station.

9. The invention set forth in claim 8 wherein said link control means includes link relays selectively operable over both said first and said second paths, said link control means further including transmission path reversing relays operable in parallel with said link relays when said link relays are operated from said second path.

10. The invention set forth in claim 7 further comprising means responsive to the enabling of said key associated with said intercom line at said selected one of said stations for connecting said selected station to said prepared second manner connection to said intercom link manner.

11. In a key telephone system wherein connections are established between any one of a number of stations and any one of a number of lines in response to the enabling of a key associated with a selected one of said lines at an enabling one of said stations and wherein one of said lines is arranged as an intercom link between said stations, said intercom link having first, second and third buses, the combination comprising a plurality of wideband units individually associated with said stations, mean operable in response to the enabling of a key associated with said intercom line at a first station for enabling an audio transmission path between said first station and said first bus of said intercom link, means selectably operable in response to signals transmitted from said first station over said enabled audio transmission path for enabling a wideband transmit path between said first station and said second bus of said intercom link for enabling a wideband receive path between said first station and said third bus of said intercom link, and for signaling a called station, and means responsive to the enabling of the key associated with said intercom link at said called station for completing bidirectional audio and wideband transmission paths between said intercom link and said called station in a manner such that an audio transmission path, a wideband transmit path, and a wideband receive path are established between said called station and said first, third and second buses, respectively, of said intercom link.

12. The invention set forth in claim 11 wherein said called station signaling means further comprises means for inhibiting all stations except the called station from gaining access to said established transmission paths.

13. In a key telephone system having a plurality of stations and having a selective intercommunication link between the stations for providing audio and video transmission between any two selected stations, said link having first, second and third buses, the combination comprising means responsive to a first signal from a first station for establishing an audio transmission path from said first station to said first bus of said link, means responsive to a second signal from said first station for establishing a video transmit path from said first station to said second bus of said link and for establishing a video receive path from said first station to said third bus of said link, means enabled by said first signal for inhibiting the establishment of transmission paths to said link from other of said stations while said transmission paths from said first station are established, and means responsive to other signals from said first station for establishing a video transmit path from said third bus of said link to a selected second station and for establishing a video receive path from said second bus of said link to said selected second station whereby bidirectional audio and video transmission paths are established between said first and second stations.

14. The invention set forth in claim 13 further comprising a plurality of lines connectable to any of the stations;

means for establishing a bidirectional audio and video path from any of said stations to any of said lines;

conference means for enabling a three-party conference between a line and said first and said second stations;

said conference means comprising means responsive to signals from said first station for alternatively enabling video transmission between said first station and said line or between said first station and said second station; and means for maintaining said audio transmission among said line, said first station and said second station.

15. In combination a plurality of communication stations each station arranged for two-way transmission over an audio path, outgoing wideband transmission over a transmit path and incoming wideband transmission over a receive path;

an intercom link common to all of said stations, said link comprising an audio bus, a wideband transmit bus and a wideband receive bus;

a station lockout circuit operable in response to first signals from any of said stations for establishing a two-way audio transmission path between a signaling station and said audio bus;

wideband means in said station lockout circuit operable in response to second signals over an established audio path from a first station for establishing a wideband outgoing transmission path from said first station to said wideband transmit bus and for establishing a wideband incoming transmission path from said first station to said wideband receive bus;

means in said station lockout circuit responsive to said first signals from said first station for inhibiting the concurrent establishment of said transmission paths from any other station;

a selector circuit operable in response to other signals from said first station for reversing said incoming and outgoing transmission paths from a called station and for signaling said calling station;

audio means enabled by said selector circuit and responsive to a first signal from said called station for establishing a two-way audio transmission path from said called station to said audio bus; and means jointly responsive to the enabling of said audio means and to the enabling of said wideband means for establishing a wideband outgoing transmission path from said called station to said wideband receive bus and for establishing a wideband incoming transmission path from said called station to said wideband transmit bus.

16. The invention set forth in claim 15 further comprising a wideband key telephone system selectably connectable to said first station, means at said first station for enabling exclusive two-way audio, outgoing wideband, and incoming wideband transmission between said first station and said wideband key telephone system, conference signal means at said first station, conference means associated with said intercom link operable in response to an enabled conference signal from said first station for extending said two-way audio transmission from said first station and said key telephone system to said called station via said audio bus while said wideband transmission is exclusively enabled between said first station and said key telephone system.

17. The invention set forth in claim 16 further comprising means associated with said intercom link responsive to said first signal from said first station for inhibiting said wideband transmission between said first station and said key telephone system and for enabling said wideband transmission between said first station and said called station via said wideband receive and wideband transmit buses while maintaining said two-way audio transmission between said first station, said called station and said key telephone system.

18. In a key telephone system having a plurality of stations arranged for both audio and wideband transmission and connectable to incoming lines for both audio and wideband transmission the combination comprising an intercom link common to said stations, conference control means, first means for establishing audio transmission simultaneously to at least one line and a plurality of stations through said link and said conference control means, and second means including said conference control means and said link for establishing wideband transmission between said line and only one of said stations.

19. In a key telephone system the combination in accordance with claim 18 wherein said second means includes means for alternatively establishing wideband transmission between a first station and said one line or between said first station and another of said stations.

* * * * *

UNITED STATES PATENT OFFICE

CERTIFICATE OF CORRECTION

Patent No. 3,649,761 Dated March 14, 1972

Inventor(s) Stanley E. Bush, David T. Olson, George E. Saltus

It is certified that error appears in the above-identified patent and that said Letters Patent are hereby corrected as shown below:

Column 4, lines 17 and 18, "audio-video link selector control 16" should read --audio-video link 13--.

Column 4, lines 21 and 22, "audio-video link selector control 16" should read --audio-video link 13--.

Column 9, line 8, "lead 5TM" should read --lead TM--.

Signed and sealed this 31st day of October 1972.

(SEAL)
Attest:

EDWARD M.FLETCHER,JR.
Attesting Officer

ROBERT GOTTSCHALK
Commissioner of Patents